US008151259B2

(12) United States Patent
Fadell

(10) Patent No.: US 8,151,259 B2
(45) Date of Patent: Apr. 3, 2012

(54) REMOTE CONTENT UPDATES FOR PORTABLE MEDIA DEVICES

(75) Inventor: Anthony M. Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 1617 days.

(21) Appl. No.: 11/324,863

(22) Filed: Jan. 3, 2006

(65) Prior Publication Data

US 2007/0169087 A1    Jul. 19, 2007

(51) Int. Cl.
*G06F 9/44*    (2006.01)
*G06F 3/00*    (2006.01)
*G06F 9/46*    (2006.01)
*G06F 13/00*   (2006.01)

(52) U.S. Cl. ........ 717/173; 717/168; 717/169; 717/171; 717/172; 719/321; 719/322

(58) Field of Classification Search .......... None
See application file for complete search history.

(56) References Cited

U.S. PATENT DOCUMENTS

| | | |
|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,908,523 A | 3/1990 | Snowden et al. |
| 4,928,307 A | 5/1990 | Lynn |
| 4,951,171 A | 8/1990 | Tran et al. |
| 5,185,906 A | 2/1993 | Brooks |
| 5,293,494 A | 3/1994 | Saito et al. |
| 5,379,057 A | 1/1995 | Clough |
| 5,406,305 A | 4/1995 | Shimomura et al. |
| 5,559,945 A | 9/1996 | Beaudet et al. |
| 5,566,337 A | 10/1996 | Szymanski et al. |
| 5,583,993 A | 12/1996 | Foster et al. |
| 5,608,698 A | 3/1997 | Yamanoi et al. |
| 5,616,876 A | 4/1997 | Cluts |
| 5,617,386 A | 4/1997 | Choi |
| 5,670,985 A | 9/1997 | Cappels, Sr. et al. |

(Continued)

FOREIGN PATENT DOCUMENTS

DE          43 34 773 A1    4/1994

(Continued)

OTHER PUBLICATIONS

"12.1 925 Candela Mobile PC", downloaded from LCDHardware.com on Dec. 19, 2002, http://www.lcdharware.com/panel/12_1_panel/default.asp.

(Continued)

*Primary Examiner* — Emerson Puente
*Assistant Examiner* — Jonathan R Labud
(74) *Attorney, Agent, or Firm* — Beyer Law Group LLP

(57) ABSTRACT

Improved techniques for interaction between a host device (e.g., host computer) and a portable media device (e.g., media player) are disclosed. According to one embodiment, interaction between the host device and the portable media device can be performed over a network. The network can include wired and/or wireless components. The network can also be local, regional or global in geographic coverage. The interaction over the network can be initiated by the portable media device, manually or automatically, so as to request a content update from the host device. In response to the requested content update, updated content is received at the portable media device from the host device, provided a network connection between the portable media device and the host device is available through the network.

32 Claims, 9 Drawing Sheets

U.S. PATENT DOCUMENTS

| | | |
|---|---|---|
| 5,675,362 A | 10/1997 | Clough |
| 5,684,513 A | 11/1997 | Decker |
| 5,710,922 A | 1/1998 | Alley et al. |
| 5,712,949 A | 1/1998 | Kato et al. |
| 5,717,422 A | 2/1998 | Fergason |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,760,588 A | 6/1998 | Bailey |
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,041,023 A | 3/2000 | Lakhansingh |
| 6,052,654 A | 4/2000 | Gaudet et al. |
| 6,108,426 A | 8/2000 | Stortz |
| 6,122,340 A | 9/2000 | Darley et al. |
| 6,158,019 A | 12/2000 | Squibb |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,297,795 B1 | 10/2001 | Kato et al. |
| 6,298,314 B1 | 10/2001 | Blackadar et al. |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,403 B1 | 7/2003 | Keller et al. |
| 6,587,404 B1 | 7/2003 | Keller et al. |
| 6,606,281 B2 | 8/2003 | Cowgill et al. |
| 6,611,607 B1 | 8/2003 | Davis et al. |
| 6,611,789 B1 | 8/2003 | Darley |
| 6,617,963 B1 | 9/2003 | Watters et al. |
| 6,621,768 B1 | 9/2003 | Keller et al. |
| 6,693,612 B1 | 2/2004 | Matsumoto et al. |
| 6,731,312 B2 | 5/2004 | Robbin |
| 6,762,741 B2 | 7/2004 | Weindorf |
| 6,781,611 B1 | 8/2004 | Richard |
| 6,794,566 B2 | 9/2004 | Pachet |
| 6,799,226 B1 | 9/2004 | Robbin et al. |
| 6,801,964 B1 | 10/2004 | Mahdavi |
| 6,832,373 B2 * | 12/2004 | O'Neill .................... 717/171 |
| 6,844,511 B1 | 1/2005 | Hsu et al. |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,886,749 B2 | 5/2005 | Chiba et al. |
| 6,898,550 B1 | 5/2005 | Blackadar et al. |
| 6,911,971 B2 | 6/2005 | Suzuki et al. |
| 6,918,677 B2 | 7/2005 | Shipman |
| 6,931,377 B1 | 8/2005 | Seya |
| 6,934,812 B1 | 8/2005 | Robbin et al. |
| 6,950,087 B2 | 9/2005 | Knox et al. |
| 7,010,365 B2 | 3/2006 | Maymudes |
| 7,046,230 B2 | 5/2006 | Zadesky |
| 7,062,225 B2 | 6/2006 | White |
| 7,076,561 B1 | 7/2006 | Rosenberg et al. |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,131,059 B2 | 10/2006 | Obrador |
| 7,143,241 B2 | 11/2006 | Hull |
| 7,146,437 B2 | 12/2006 | Robbin et al. |
| 7,171,331 B2 | 1/2007 | Vock et al. |
| 7,191,244 B2 | 3/2007 | Jennings et al. |
| 7,213,228 B2 | 5/2007 | Putterman et al. |
| 7,234,026 B2 | 6/2007 | Robbin et al. |
| 7,277,928 B2 | 10/2007 | Lennon |
| 7,301,857 B2 | 11/2007 | Shah et al. |
| 7,356,679 B1 | 4/2008 | Le et al. |
| 7,508,535 B2 | 3/2009 | Hart et al. |
| 2001/0013983 A1 | 8/2001 | Izawa et al. |
| 2001/0029178 A1 * | 10/2001 | Criss et al. .................... 455/419 |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0028683 A1 | 3/2002 | Banatre et al. |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0059440 A1 | 5/2002 | Hudson et al. |
| 2002/0059499 A1 | 5/2002 | Hudson |
| 2002/0090912 A1 | 7/2002 | Cannon et al. |
| 2002/0116082 A1 | 8/2002 | Gudorf |
| 2002/0116517 A1 | 8/2002 | Hudson et al. |
| 2002/0122031 A1 | 9/2002 | Maglio et al. |
| 2002/0123359 A1 | 9/2002 | Wei et al. |
| 2002/0152045 A1 | 10/2002 | Dowling et al. |
| 2002/0156833 A1 | 10/2002 | Maurya et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2002/0199043 A1 | 12/2002 | Yin |
| 2003/0002688 A1 | 1/2003 | Kanevsky et al. |
| 2003/0007001 A1 | 1/2003 | Zimmerman |
| 2003/0018799 A1 | 1/2003 | Eyal |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0104835 A1 | 6/2003 | Douhet |
| 2003/0127307 A1 | 7/2003 | Liu et al. |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0182100 A1 * | 9/2003 | Plastina et al. .................... 704/1 |
| 2003/0221541 A1 | 12/2003 | Platt |
| 2003/0229490 A1 | 12/2003 | Etter |
| 2003/0236695 A1 | 12/2003 | Litwin, Jr. |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0066363 A1 | 4/2004 | Yamano et al. |
| 2004/0069122 A1 | 4/2004 | Wilson |
| 2004/0076086 A1 | 4/2004 | Keller |
| 2004/0086120 A1 | 5/2004 | Akins, III et al. |

| | | |
|---|---|---|
| 2004/0094018 A1 | 5/2004 | Ueshima et al. |
| 2004/0103411 A1* | 5/2004 | Thayer .......... 717/171 |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0198436 A1 | 10/2004 | Alden |
| 2004/0210628 A1* | 10/2004 | Inkinen et al. .......... 709/201 |
| 2004/0216108 A1* | 10/2004 | Robbin .......... 718/100 |
| 2004/0224638 A1 | 11/2004 | Fadell et al. |
| 2004/0242224 A1 | 12/2004 | Janik et al. |
| 2004/0246275 A1 | 12/2004 | Yoshihara et al. |
| 2004/0255135 A1 | 12/2004 | Kitaya et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1 | 3/2005 | Popofsky |
| 2005/0060542 A1 | 3/2005 | Risan et al. |
| 2005/0102377 A1 | 5/2005 | King et al. |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0146534 A1 | 7/2005 | Fong et al. |
| 2005/0149213 A1 | 7/2005 | Guzak et al. |
| 2005/0152294 A1 | 7/2005 | Yu et al. |
| 2005/0156047 A1 | 7/2005 | Chiba et al. |
| 2005/0160270 A1 | 7/2005 | Goldberg et al. |
| 2005/0166153 A1 | 7/2005 | Eytchison et al. |
| 2005/0216855 A1* | 9/2005 | Kopra et al. .......... 715/767 |
| 2005/0218303 A1 | 10/2005 | Poplin |
| 2005/0234983 A1 | 10/2005 | Plastina et al. |
| 2005/0246324 A1 | 11/2005 | Paalasmaa et al. |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2005/0270276 A1 | 12/2005 | Sugimoto et al. |
| 2006/0013414 A1 | 1/2006 | Shih |
| 2006/0025068 A1 | 2/2006 | Regan et al. |
| 2006/0026424 A1* | 2/2006 | Eto .......... 713/165 |
| 2006/0061563 A1 | 3/2006 | Fleck |
| 2006/0068760 A1 | 3/2006 | Hameed et al. |
| 2006/0071899 A1 | 4/2006 | Chang et al. |
| 2006/0088228 A1 | 4/2006 | Marriott et al. |
| 2006/0092122 A1 | 5/2006 | Yoshihara et al. |
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0135883 A1 | 6/2006 | Jonsson et al. |
| 2006/0145053 A1 | 7/2006 | Stevenson et al. |
| 2006/0152382 A1 | 7/2006 | Hiltunen |
| 2006/0155914 A1 | 7/2006 | Jobs et al. |
| 2006/0170535 A1 | 8/2006 | Watters et al. |
| 2006/0173974 A1 | 8/2006 | Tang |
| 2006/0190577 A1 | 8/2006 | Yamada |
| 2006/0190980 A1 | 8/2006 | Kikkoji et al. |
| 2006/0221057 A1 | 10/2006 | Fux et al. |
| 2006/0221788 A1 | 10/2006 | Lindahl et al. |
| 2006/0259758 A1 | 11/2006 | Deng et al. |
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1 | 1/2007 | Hellman |
| 2007/0028009 A1 | 2/2007 | Robbin et al. |
| 2007/0061759 A1 | 3/2007 | Klein, Jr. |
| 2007/0089057 A1* | 4/2007 | Kindig .......... 715/716 |
| 2007/0106660 A1 | 5/2007 | Stern et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |
| 2010/0077338 A1 | 3/2010 | Matthews et al. |

FOREIGN PATENT DOCUMENTS

| | | |
|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1289197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| GB | 2399639 | 5/2005 |
| JE | 2000-90651 | 3/2000 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| KR | 20010076508 | 8/2001 |
| WO | WO 95/16950 | 6/1995 |
| WO | WO 98/17032 | 4/1998 |
| WO | WO 99/28813 | 6/1999 |
| WO | WO 00/22820 | 4/2000 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | 2004/061850 A1 | 7/2004 |
| WO | WO 2004/055637 | 7/2004 |
| WO | WO 2004/084413 A2 | 9/2004 |
| WO | WO 2004/104815 | 12/2004 |
| WO | WO 2005/031737 | 4/2005 |
| WO | WO 2005/048644 | 5/2005 |
| WO | WO 01/33569 | 6/2005 |
| WO | WO 2005/008505 | 7/2005 |
| WO | WO 2005/109781 | 11/2005 |
| WO | WO 2006/040737 | 4/2006 |
| WO | WO 2006071364 | 6/2006 |

OTHER PUBLICATIONS

"BL82 Series Backlit Keyboards", www.tg3electronics.com/products/backlit/backlit.htm, downloaded Dec. 19, 2002.

"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.

"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].

"Eluminx Illuminated Keyboard", downloaded Dec. 19, 2002, http://www.elumix.com/.

"How to Pair a Bluetooth Headset & Cell Phone", About.com; downloaded on Apr. 29, 2006 from http://mobileoffice.about.com/od/usingyourphone/ht/blueheadset_p.htm.

"Peripherals for Industrial Keyboards & Pointing Devices", Stealth Computer Corporation, downloaded on Dec. 19, 2002, http://www.stealthcomputer.com/peropherals_oem.htm.

"Poly-Optical Fiber Optic Membrane Switch Backlighting", downloaded Dec. 19, 2002, http://www.poly/optical.com/membrane_switches.html.

"Public Safety Technologies Tracer 2000 Computer", downloaded Dec. 19, 2002, http://www.pst911.com/traver.html.

"Quicxime Movie Playback Programming Guide", Apple Computer, Inc., Aug. 11, 2005.

"Quicxime Overview", Apple Computer, Inc., Aug. 11, 2005.

"Rocky Matrix Backlit Keyboard", downloaded Dec. 19, 2002, http://www.amrel.com/asi_matrixkeyboard.html.

"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg jsp?cc=global&lc=en&ver=4001&template=pc3_1_1 &z . . .

"Taos, Inc., Announces Industry's First Ambient Light Sensor to Convert Light Intensity to Digital Signals", www.taosinc.com/pressrelease_090902.htm, downloaded Jan. 23, 2003.

"Toughbook 28: Powerful, Rugged and Wireless", Panasonic: Toughbook Models, downloaded Dec. 19, 2002, http:www.panasonic.com/computer/notebook/html/0la_s8.htm.

"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.

"WhyBuy: Think Pad", IBM ThinkPad Web Page Ease of Use, downloaded on Dec. 19, 2002, http://www.pc.ibm.com/us/thinkpad/easeofuse.html.

512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.

Alex Veiga, "AT&T Wireless Launching Music Service," Yahoo! Finance, Oct. 5, 2004, pp. 1/2.

Apple iPod Technical Specifications, iPod 20GB and 60GB Mac + PC, downloaded from http://www.apple.com/ipod/color/specs.html on Aug. 8, 2005.

Apple iTunes Smart Playlists, downloaded Apr. 5, 2005 from http://web.archive.org/web/20031002011316/www.apple.com/itunes/smartplaylists.... pp. 1-2.

Bociurkiw, Michael, "Product Guide: Vanessa Matz,", www.forbes.com/asap/2000/1127/vmartz_print.html, Nov. 27, 2000.

CREATIVE: "Creative NOMAD MuVo TX," www.creative.com, Nov. 1, 2004, http://web.archive.org/web/20041024175952/www.creative.com/products/pfriendly.a sp?product=9672 [downloaded Jun. 6, 2006].

CREATIVE: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].

CREATIVE: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].

iAP Sports Lingo 0x09 Protocol V1.00, May 1, 2006.

International Search Report dated Feb. 4, 2003 in corresponding application No. PCT/US2002/033330.

International Search Report dated Dec. 5, 2007 in PCT Application No. PCT/US2007/004810.

International Search Report dated Jul. 2, 2007 in related case PCT/US2006/048669.

International Search Report dated Jun. 19, 2007 in related Application PCT/US2006/048753.

International Search Report dated Nov. 24, 2006 in PCT Application No. PCT/US2005/046797.

International Search Report in corresponding European Application No. 06256215.2 dated Feb. 20, 2007.

International Search Report in Patent Application No. PCT/US2006/048738 dated Jan. 29, 2008.

International Search Report in Patent Application No. PCT/US2007/077020 dated Jan. 28, 2008.

International Search Report in Patent Application No. PCT/US2007/076889 dated Jan. 28, 2008.

Invitation to Pay Additional Fees and Partial Search Report for corresponding PCT Application No. PCT/US2005/046797 dated Jul. 3, 2006.

iTunes, Wikipedia, the free encyclopedia; downloaded on Oct. 5, 2005, pp. 1-6.

Jabra Bluetooth Headset User Manual; GN Netcom A/s, 2005.

Jabra Bluetooth Introduction; GN Netcom A/S, Oct. 2004.

Jabra FreeSpeak BT200 User Manual; Jabra Corporation, 2002.

Kennedy, "Digital Data Storage Using Video Disc," IBM Technical Disclosure Bulletin, vol. 24, No. 2, Jul. 1981.

Nonhoff-Arps, et al., "Straβenmusik Portable MP3-Spieler mit USB-Anschluss," CT Magazin Fuer Computer Technik, Verlag Heinz Heise GMBH, Hannover DE, No. 25, Dec. 4, 2000.

Nutzel et al., "Sharing Systems for Future HiFi Systems", The Computer Society, Jun. 2004.

Partial Search Report dated Sep. 6, 2007 in PCT Application No. PCT/US2007/004810.

Peter Lewis, "Two New Ways to Buy Your Bits," CNN Money, Dec. 31, 2003, pp. 1/4.

Sastry, Ravindra Wadali. "A Need for Speed: A New Speedometer for Runners", submitted to the Department of Electrical Engineering and Computer Science at the Massachusetts Institute of Technology, May 28, 1999.

Spiller, Karen. "Low-decibel earbuds keep noise at a reasonable level", The Telegraph Online, dated Aug. 13, 2006, http://www.nashuatelegraph.conm/apps/pbcs.dll/article?Date=20060813&Cate... Downloaded Aug. 16, 2006.

Written Opinion dated Dec. 5, 2007 in PCT Application No. PCT/US2007/004810.

Written Opinion in Patent Application No. PCT/US2006/048738 dated Jan. 29, 2008.

Written Opinion in Patent Application No. PCT/US2007/076889 dated Jan. 28, 2008.

Written Opinion in Patent Application No. PCT/US2007/077020 dated Jan. 28, 2008.

U.S. Appl. No. 11/621,541, "Personalized Podcasting Podmapping" filed Jan. 9, 2007.

Waterproof Music Player with FM Radio and Pedometer User Manual, Oregon Scientific, 2005.

Written Opinion of the International Searching Authority dated Nov. 24, 2006 in PCT Application No. PCT/US2005/046797.

Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.

International Search Report dated May 21, 2007 from corresponding PCT Application No. PCT/US2006/048670.

"Combination Belt Clip Leaf Spring and Housing Latch", Wandt et al.; Motorola Technical Developments, Motorla Inc. Schaumburg, IL. vol. 18, Mar. 1, 1993.

"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.

"Creative liefert erstes Portable Media Center aus" [Online] Sep. 2, 2004, Retrieved from the internet on Sep. 20, 2007 from http://www.golem.de/0409/33347.html>.

International Search Report dated Feb. 18, 2008 in Patent Application No. PCT/US2007/079766.

International Search Report dated Jul. 7, 2008 in PCT Application No. PCT/US2007/076793.

International Search Report dated Jun. 10, 2008 in PCT Application No. PCT/US2007/010630.

International Search Report Dated Sep. 27, 2007 in Application No. 05824296.7.

Invitation to Pay Additional Fees and Partial Search Report for PCT Application No. PCT/US2007/077160 dated Apr. 1, 2008.

Notification of Reason for Rejection from PCT Application No. 2003-539048 dated Nov. 27, 2007.
Office Action dated Feb. 20, 2008 in Japanese Application No. 2007-538196.
Office Action dated Feb. 25, 2008 in U.S. Appl. No. 11/749,599.
Office Action dated Jun. 17, 2008 in U.S. Appl. No. 11/212,313.
Office Action dated Mar. 4, 2008 from U.S. Appl. No. 10/973,657.
Office Action dated May 30, 2008 in Chinese Patent Application No. 02825938.6.
Office Action in Chinese Patent Application No. 2008-045351 dated Aug. 5, 2008.
Office Action in U.S. Appl. No. 11/212,555 dated Aug. 14, 2008.
Partial International Search Report dated Feb. 1, 2008 in Patent Application No. PCT/US2007/010630.
Search Report dated Mar. 20, 2008 in Patent Application No. PCT/US2007/077789.
Search Report dated May 15, 2008 in PCT Application No. PCT/US2007/019578.
Written Opinion dated Feb. 18, 2008 in Patent Application No. PCT/US2007/079766.
Written Opinion dated Jul. 7, 2008 in PCT Application No. PCT/US2007/076793.
Written Opinion dated Jun. 10, 2008 in PCT Application No. PCT/US2007/010630.
Written Opinion dated Mar. 20, 2008 in Patent Application No. PCT/US2007/077789.
Written Opinion dated May 15, 2008 in PCT Application No. PCT/US2007/019578.
Yee et al., "Faceted Metadata for Image Search and Browsing." Association for Computing Machinery, Conference Proceedings, Apr. 5, 2003.
Office Action dated May 27, 2009 in U.S. Appl. No. 11/439,613.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Oct. 16, 2008 in U.S. Appl. No. 11/327,544.
Office Action dated Jun. 2, 2009 in U.S. Appl. No. 11/530,773.
Office Action dated May 11, 2009 in U.S. Appl. No. 11/680,580.
Notice of Allowance dated Apr. 21, 2009 in U.S. Appl. No. 11/327,544.
Office Action in European Patent Application No. 05 855 368.6 dated Nov. 20, 2008.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Written Opinion dated Oct. 10, 2008 in PCT Application No. PCT/US2007/077160.
Office Action dated Jan. 26, 2009 in U.S. Appl. No. 11/373,468.
Office Action dated Sep. 1, 2008 in EP Application No. 06 256 215.2.
Written Opinion dated Jan. 6, 2009 in Singapore Application No. 200701865-8.
Office Action dated Mar. 30, 2009 in U.S. Appl. No. 11/515,270.
Office Action dated Apr. 9, 2009 in U.S. Appl. No. 11/583,199.
Notice of Allowance dated Jun. 15, 2009 in U.S. Appl. No. 11/212,313.
Office Action dated Jun. 24, 2009 in U.S. Appl. No. 11/373,468.
Office Action dated Jun. 22, 2009 in U.S. Appl. No. 11/515,270.
Office Action dated Jun. 24, 2009 in U.S. Appl. No. 11/519,352.
Office Action dated Sep. 10, 2009 in U.S. Appl. No. 11/746,548.
Office Action dated Sep. 2, 2009 in U.S. Appl. No. 11/515,270.
Office Action dated Oct. 16, 2009 in U.S. Appl. No. 11/583,199.
Office Action dated Oct. 23, 2009 in Chinese Application No. 200580048143.9.
Office Action dated Nov. 16, 2009 in U.S. Appl. No. 11/439,613.
Office Action dated Nov. 16, 2009 in U.S. Appl. No. 11/144,541.
Office Action dated May 29, 2009 in EP Application No. 06 847 856.9.
European Office Action dated Nov. 15, 2010 in EP Application No. 06 847 856.9.
Korean Office Action dated Jan. 13, 2011 in Korean Patent Application No. 10-2008-7019064.
Office Action dated Mar. 24, 2010 in U.S. Appl. No. 11/583,199.
Office Action dated Mar. 25, 2010 in U.S. Appl. No. 11/297,032.
Office Action dated Mar. 10, 2010 in U.S. Appl. No. 11/583,327.
Office Action dated Mar. 11, 2010 in U.S. Appl. No. 11/830,746.
Office Action dated Mar. 9, 2010 in U.S. Appl. No. 11/519,352.
Office Action dated Dec. 11, 2009 in U.S. Appl. No. 11/519,352.
Office Action dated Dec. 16, 2009 in U.S. Appl. No. 11/746,548.
Office Action dated Feb. 3, 2010 in U.S. Appl. No. 11/439,613.
Office Action dated Dec. 14, 2009 in U.S. Appl. No. 11/535,646.
Examination Report dated Sep. 1, 2009 in Singapore Application No. 200701865-8.
Office Action dated Sep. 25, 2009 in Chinese Application No. 200610130904.1.
Notice of Allowance dated Feb. 4, 2010 in U.S. Appl. No. 11/535,646.
Office Action dated Apr. 12, 2010 in U.S. Appl. No. 12/397,051.
Office Action dated Apr. 13, 2010 in U.S .Appl. No. 12/406,793.
Office Action dated Apr. 15, 2010 in U.S. Appl. No. 11/373,468.
Chinese Office Action dated Jun. 23, 2011 from Chinese Application No. 200680053217.2.
"Apple Announces iTunes 2," Press Release, Apple Computer, Inc., Oct. 23, 2001.
"Apple Introduces iTunes—World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"Digital Still Cameras—Downloading Images to a Computer," Mimi Chakarova et al., Multi-Media Reporting and Convergence, 2 pgs., May 9, 2005.
Adam C. Engst, "SoundJam Keeps on Jammin'," Jun. 19, 2000, http://db.tidbits.com/getbits.acgi?tbart=05988.
Andrew Birrell, "Personal Jukebox (PJB)," Oct. 13, 2000, http://birrell.org/andrew/talks/pjb-overview.ppt.
Compaq, "Personal Jukebox," Jan. 24, 2001, http://research.compaq.com/SRC/pjb/.
De Herrera, Chris, "Microsoft ActiveSync 3.1," Version 1.02, Oct. 13, 2000.
IEEE 1394—Wikipedia, 1995, http://www.wikipedia.org/wiki/Firewire.
International Search Report dated Jul. 10, 2007 in corresponding application No. PCT/US2006/048738.
International Search Report dated Apr. 5, 2006 from corresponding International Application No. PCT/US2005/038819.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
Personal Jukebox (PJB), "Systems Research Center and PAAD," Compaq Computer Corp., Oct. 13, 2000, http://research.compaq.com/SRC/pjb/.
SoundJam MP Plus, Representative Screens, published by Casady & Greene, Inc., Salinas, CA, 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
Office Action dated May 10, 2010 in EP Application No. 06 847 856.9.

* cited by examiner

REMOTE CONTENT UPDATES FOR PORTABLE MEDIA DEVICES

CROSS-REFERENCE TO RELATED APPLICATIONS

This application is related to U.S. Provisional Application No. 60/756,122, filed concurrently herewith, and entitled "MULTIMEDIA DATA SHARING," which is hereby incorporated herein by reference.

This application is also related to: (i) U.S. application Ser. No. 10/987,649, filed Nov. 12, 2004, and entitled "WIRELESS SYNCHRONIZATION BETWEEN MEDIA PLAYER AND HOST DEVICE," which is hereby incorporated herein by reference; (ii) U.S. application Ser. No. 10/973,657, filed Oct. 25, 2004, and entitled "IMAGE SCALING ARRANGEMENT," which is hereby incorporated herein by reference; (iii) U.S. application Ser. No. 10/973,925, filed Oct. 25, 2004, and entitled "MULTIPLE MEDIA TYPE SYNCHRONIZATION BETWEEN HOST COMPUTER AND MEDIA DEVICE," which is hereby incorporated herein by reference; (iv) U.S. application Ser. No. 10/423,490, filed Apr. 25, 2003, and entitled "MEDIA PLAYER SYSTEM," which is hereby incorporated herein by reference; (v) U.S. application Ser. No. 10/277,418, filed Oct. 21, 2002, and entitled "INTELLIGENT INTERACTION BETWEEN MEDIA PLAYER AND HOST COMPUTER," which is hereby incorporated herein by reference; and (vi) U.S. application Ser. No. 10/118,069, filed Apr. 5, 2002, and entitled "INTELLIGENT SYNCHRONIZATION OF MEDIA PLAYER WITH HOST COMPUTER," which is hereby incorporated herein by reference.

BACKGROUND OF THE INVENTION

1. Field of the Invention

The present invention relates to portable media devices and, more particularly, to updating content resident on portable media devices.

2. Description of the Related Art

Synchronization operations have been conventionally performed between portable devices, such as Personal Digital Assistants (PDAs) and host computers, to synchronize electronic files or other resources. For example, these files or other resources can pertain to text files, data files, calendar appointments, emails, to-do lists, electronic rolodexes, etc. However, such synchronization schemes have traditionally used filenames and modification dates to determine whether files need to be copied between the devices. These synchronization schemes can be largely automated but nevertheless have to be initiated manually while the devices are connected.

In the case of media players, such as MP3 players, files are typically moved between a host computer and a media player through use of a drag and drop operation, like is conventionally done with respect to copying of a data file from a Windows desktop to a floppy disk. Hence, the user of the media player manually performs the synchronization for individual media items. As a consequence, synchronization tends to be tedious and time consuming for users.

More recently, media players have been able to be synchronized with a host computer when a bus connection over a cable is made. Here, the synchronization can be automatically initiated by the host computer when the cable is connected between the host computer and the media player. A user of the host computer can also manually initiate synchronization so long as the cable is connected between the host computer and the media player. In either case, initiation of synchronization is performed by the host computer, which corresponds to a "push" model. Typically, the host computer will operate a media management application that facilitates the management of media and well as synchronization of some or all of such media to a media player. One example of a media management application is the iTunes® media management software offered by Apple Computer, Inc. of Cupertino, Calif. One example of a media player is the iPod® media device also offered by Apple Computer, Inc. of Cupertino, Calif., which has the capability to be synchronized with a host computer over a cable. One disadvantage with synchronization over a cable is that the cable connection must be made. A user can often forget to connect the cable. Without the cable connection, the synchronization will not occur. A user can use a docking station to simplify the connection process. However, the user can still forget to couple the media player into the docking station. Further, the cable is normally relatively short in length, such as a few feet (e.g., 2-6 feet), so the media player must be brought within a few feet of the host computer for synchronization to occur.

Thus, there is a continuing need for improved techniques to update (e.g., synchronize) content on media players when remotely located from a host computer.

SUMMARY OF THE INVENTION

The invention relates to interaction between a host device (e.g., host computer) and a portable media device (e.g., media player). According to one embodiment of the invention, interaction between the host device and the portable media device can be performed over a network. The network can include wired and/or wireless components. The network can also be local, regional or global in geographic coverage. The interaction over the network can be initiated by the portable media device, manually or automatically, so as to request a content update from the host device. For example, a user of the portable media device can interact with a user interface thereof to manually request a content update from the host device. As another example, the portable media device can automatically (i.e., without user input) request a content update from the host device. Regardless, in response to the requested content update, updated content is received at the portable media device from the host device, provided a network connection between the portable media device and the host device is available through the network. Typically, but not exclusively or necessarily, the updated content is media data.

The invention can be implemented in numerous ways, including as a method, system, device, apparatus, or computer readable medium. Several embodiments of the invention are discussed below.

As a method for updating content resident on a portable media device from a media host device over a network, one embodiment of the invention includes at least the acts of: receiving a user request to update the content resident on the portable media device from content available on the media host device; determining whether the portable media device presently has network access to the media host device; sending a content update request to the media host device when it is determined that the portable media device presently has network access to the media host device; receiving content from the media host device in response to the content update request; and storing the content received from the media host device onto the portable media device.

As a method for updating content resident on a portable media device from a media host device over a network, another embodiment of the invention includes at least the acts of: determining whether the portable media device presently has network access to the media host device; determining whether the content resident on the portable media device is to be updated from content available on the media host device when it is determined that the portable media device presently has network access to the media host device; sending a content update request to the media host device when it is determined that the content resident on the portable media device is to be updated from content available on the media host device; receiving content from the media host device in response to the content update request; and storing the content received from the media host device onto the portable media device.

As a computer readable medium including computer program code for updating content resident on a portable device from a host device over a network, one embodiment of the invention includes at least: computer program code for determining whether content resident on the portable device is to be updated from content available on the host device; computer program code for determining whether the portable device presently has network access to the host device; computer program code for sending a content update request to the host device when it is determined that not only does the portable device presently have network access to the host device but also it is determined that the content resident on the portable device is to be updated; computer program code for receiving content from the host device in response to the content update request; and computer program code for storing the content received from the host device onto the portable device.

As a portable media device capable of updating content resident thereon from a media host device over a network, one embodiment of the invention includes at least: a data storage device that stores content; and a processor for storing, accessing and presenting the stored content from the data storage device. The processor being configured to: (i) determine whether content resident on the portable media device is to be updated from content available on the media host device; (ii) determine whether the portable media device presently has network access to the media host device; (iii) send a content update request to the media host device when it is determined that not only does the portable media device presently have network access to the media host device but also it is determined that the content resident on the portable media device is to be updated; (iv) receive content from the media host device in response to the content update request; and (v) store the content received from the media host device into the data storage device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to interaction between a host device (e.g., host computer) and a portable media device (e.g., media player). According to one embodiment of the invention, interaction between the host device and the portable media device can be performed over a network. The network can include wired and/or wireless components. The network can also be local, regional or global in geographic coverage. The interaction over the network can be initiated by the portable media device, manually or automatically, so as to request a content update from the host device. For example, a user of the portable media device can interact with a user interface thereof to manually request a content update from the host device. As another example, the portable media device can automatically (i.e., without user input) request a content update from the host device. Regardless, in response to the requested content update, updated content is received at the portable media device from the host device, provided a network connection between the portable media device and the host device is available through the network. Typically, but not exclusively or necessarily, the updated content is media data.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
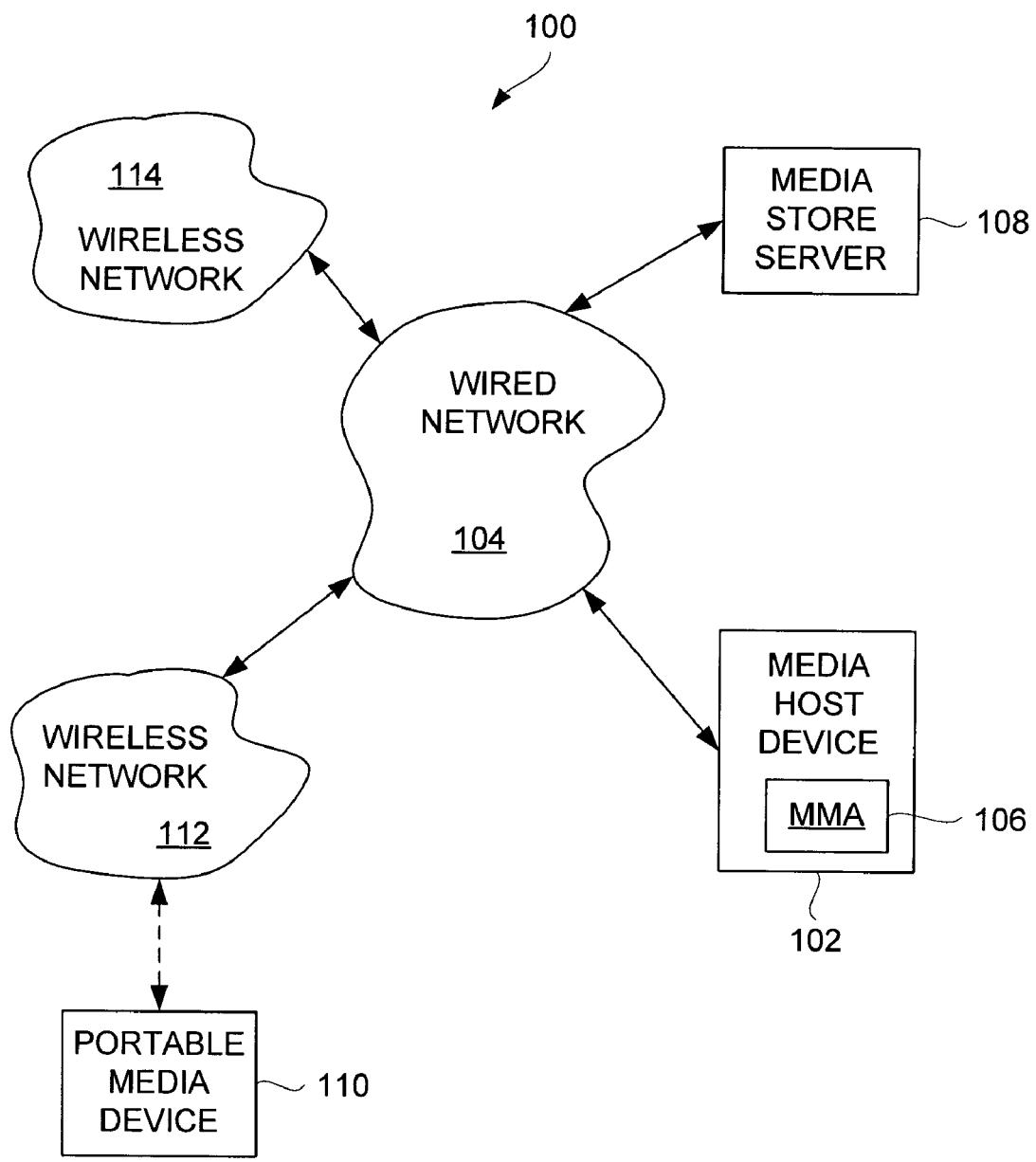
FIG. 1 is a block diagram of a network media system according to one embodiment of the invention.

FIG. 1 is a block diagram of a network media system 100 according to one embodiment of the invention. The network media system 100 supports exchange of digital data between different media devices over a network. The network media system 100 includes a media host device 102 (MHD). The media host device 102 couples to a wired network 104. The wired network 104 is a data network, such as a local area, wide area or global network. In one embodiment, the global network can correspond to the World Wide Web or the Internet. The media host device 102 operates a media management application (MMA) 106. The media management application 106 operates to assist a user of the media host device 102 in managing digital data, namely, media items, that reside on or are available to the media host device 102. The digital data can also include non-media data such as text files, database data, data files, calendar appointments, emails, to-do lists, contacts, etc.

The network media system 100 also includes a media store server 108. The media store server 108 provides an online commerce center for access to digital data, namely, media items. By interacting with the media store server 108 via the wired network 104, the media host device 102 or other devices can browse, preview, play or purchase media items. Additional details on an online commerce center are provided in U.S. Patent Publication 2005/0021478 A1, which is hereby incorporated herein by reference.

The network media system 110 also supports a portable media device 110. The portable media device 110 can wirelessly couple to the wired network 104 through a wireless network 112. The wireless network 112 is typically limited to a geographic region and so long as the portable media device 110 is within that geographical region, the portable media device 110 can normally connect to the wireless network 112 and then connect via the wired network 104 to the media host device 102 or the media store server 108. To facilitate the network connection, the portable media device 110 stores the network address of the media host device 102 and/or the media store server 108.

By connecting the portable media device 110 to the media host device 102 or the media store server 108 through the wireless network 112 and the wired network 104, the portable media device 110 can request updated content from the media host device 102 or the media store server 108. Updated content is digital data that is to be provided to the portable media device 110. In one embodiment, the updated content can be newly available data at the media host device 102, or simply different data from the media host device 102. In order for the portable media device 110 be able to connect through the one or more networks 104, 112 to the associated media host device 102, the media host device 102 must be activated. In other words, the media host device 102, e.g., a personal computer, needs to be powered-on, though it could be sleeping or in a low-power mode.

The portable media device 110 can be remotely located, even in a different country, as compared to the media host device 102 or the media store server 108, yet the portable media device 110 can request and receive updated content. The updated content can be obtained from the media store server 108 or the associated media host device 102 and delivered to the portable media device 110 over the wired network 104 and the wireless network 112. In another embodiment, the portable media device 110 could also receive, transmit or exchange digital data with another portable media device supported by the network media system 100. In one implementation, the portable media device 110 sends commands over the network 104, 112 that are performed on the media host device 102 or the media store server 108. In another implementation, the portable media device 110 can include a media management application to access and retrieve media stored remotely, such as on the media host device 102.

Although not illustrated in FIG. 1, the network media system 100 typically supports a plurality of different portable media devices. Hence, a plurality of portable media devices can couple to the wireless network 112. Likewise, the network media system 100 can also include another wireless network 114, which can serve a different geographic region. The wireless network 114 can also support a plurality of different portable media devices. Still further, the network media system 100 can also support a plurality of different media host devices. Often, a particular one of the portable media devices will be associated with a particular one of the media host devices. For example, a first user may be the owner or user associated with the media host device 102 as well as the portable media device 110. As such, the media host device 102 and the portable media device 110 would normally be associated with one another. More generally, a particular media host device may host media for one or more portable media devices.

According to one aspect of the invention, a portable media device, when in the presence of a suitable wireless network, is able to interact with its associated media host device. As a result, the portable media device can initiate an update to its stored content. The update to the stored content on the portable media device can cause different content to be stored on the portable media device. The updated content can be obtained from a media host, such as a media store server that provides an online media store, a media host device, or another portable media device. For example, even though the portable media device is remotely located from a media host, the portable media device (or its user) might request and receive a different playlist, song, video, photo album or podcast.

Figure 2:
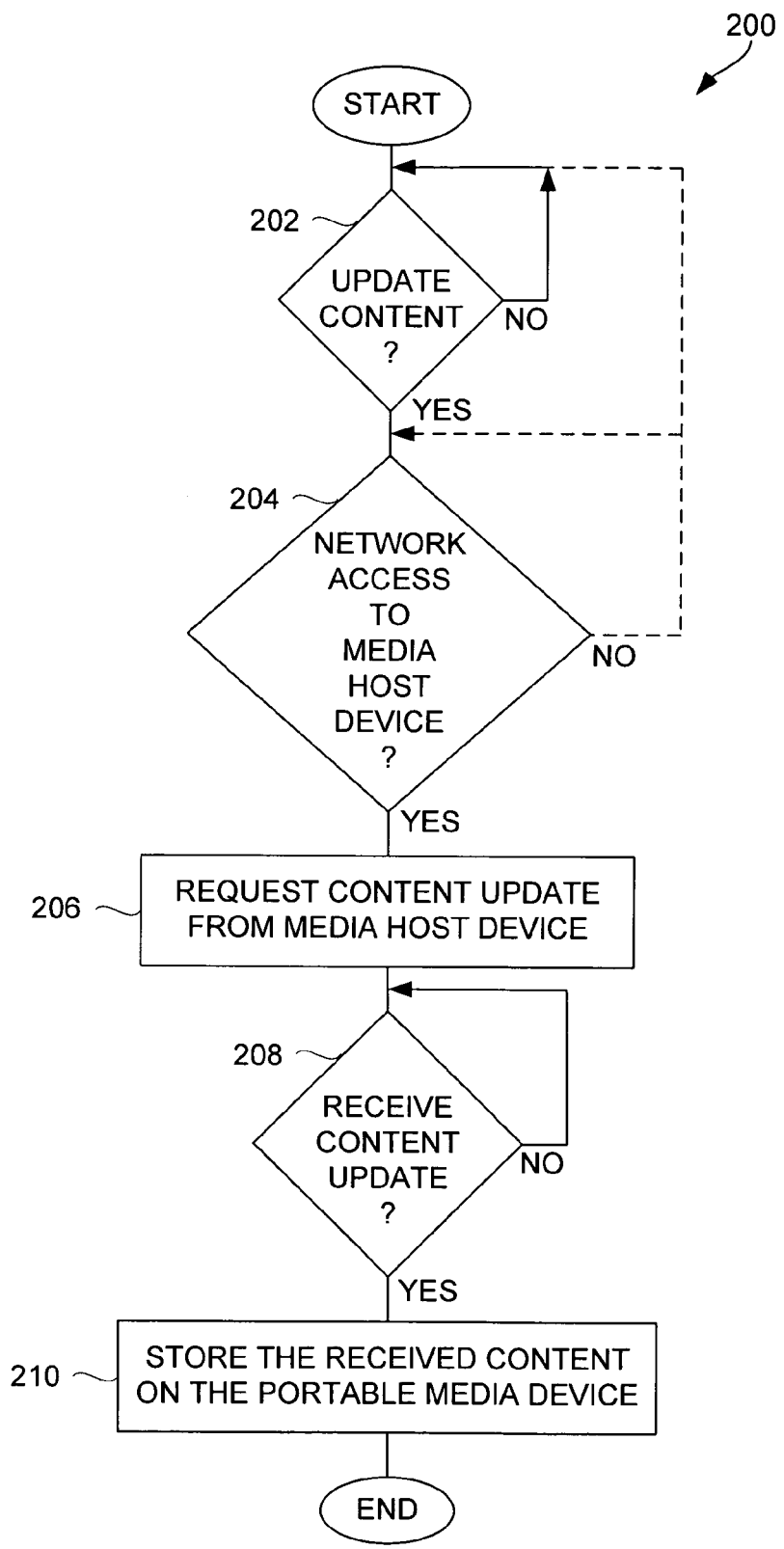
FIG. 2 is a flow diagram of a content update process according to one embodiment of the invention.

FIG. 2 is a flow diagram of a content update process 200 according to one embodiment of the invention. The content update process 200 is, for example, performed by a portable media device, such as the portable media device 110 illustrated in FIG. 1.

The content update process 200 begins with a decision 202 that determines whether a content update should be performed. When the decision 202 determines that a content update should not be performed, the content update process 200 waits until a content update is to be performed. Once the decision 202 determines that a content update is to be performed, a decision 204 determines whether network access to a media host device is available. When the decision 204 determines that network access to the media host device is not available, the content update process 200 can return to the block 202 or can await the availability of network access.

On the other hand, when the decision 204 determines that network access to the media host device is available, a content update from the media host device is requested 206. A decision 208 then determines whether a content update has been received from the media host device. When the decision 208 determines that a content update has not yet been received, the content update process 200 awaits such an update. Once the decision 208 determines that a content update has been received, the received content is stored 210 on the portable media device, thereby updating the content on the portable media device. Following the block 210, the content update process 200 is complete and ends.

Figure 3A:
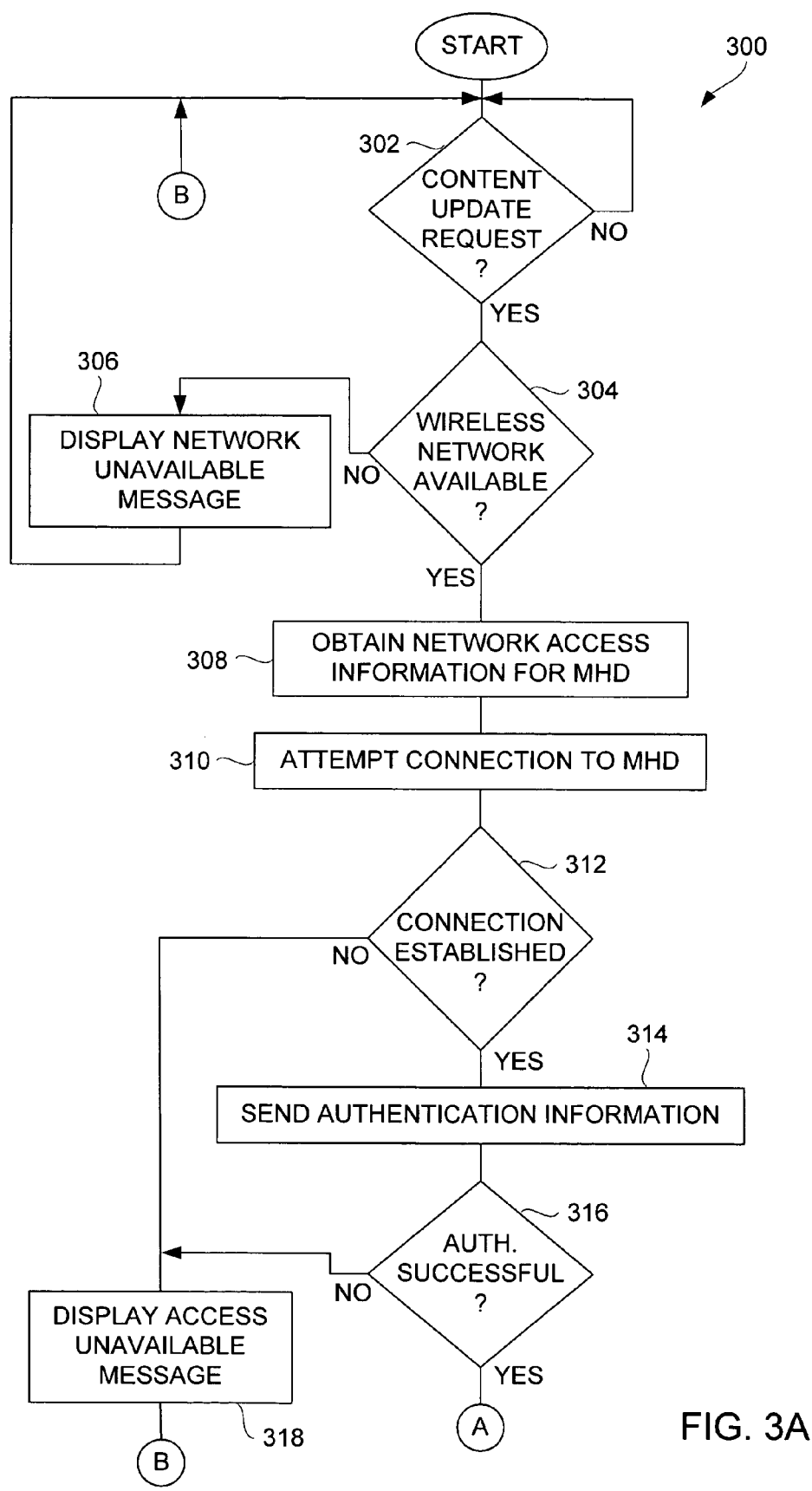
FIGS. 3A and 3B are flow diagrams of a manual content update process according to one embodiment of the invention.
Figure 3B:
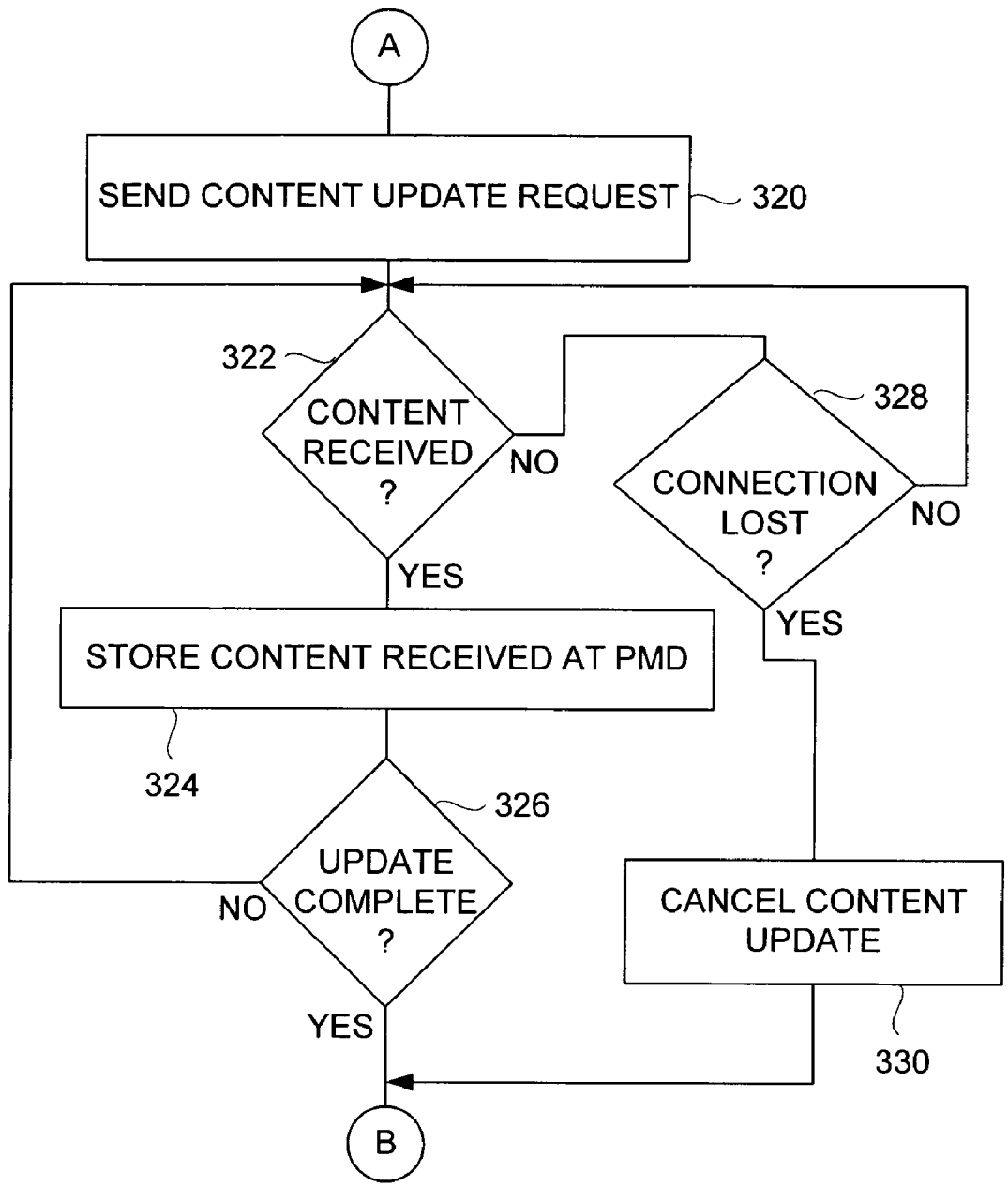

FIGS. 3A and 3B are flow diagrams of a manual content update process 300 according to one embodiment of the invention. The manual content update process 300 is, for example, performed by a portable media device, such as the portable media device 110 illustrated in FIG. 1.

The manual content update process 300 begins with a decision 302. The decision 302 determines whether a content update request has been received. Here, the content update request is caused by a user action with respect to the portable media device. Hence, when the decision 302 determines that a content update request has not been received, the manual content update process 300 awaits such a request. In other words, the manual content update process 300 is invoked when a content update request is received from a user.

Once the decision 302 determines that a content update request has been made, a decision 304 determines whether a wireless network is available to the portable media device. When the decision 304 determines that a wireless network is not available, then a network unavailable message is displayed 306 on the portable media device. Following the block 306, the manual content update process 300 returns to repeat the decision 302 so as to process a subsequent content update request.

Alternatively, when the decision 304 determines that a wireless network is available, network access information for a media host device (MHD) is obtained 308. Presumably, the media host device was previously associated with the portable media device. Then, connection (i.e., network connection) from the portable media device to the media host device is attempted 310. Here, the connection would be through one or more networks, whether wireless or wired. Next, a decision 312 determines whether the attempted connection has been established. When the decision 312 determines that a connection has been established, authentication information can be sent 314 to the media host device. In one embodiment, the authentication information is previously stored on the portable media device and is retrieved and sent 314 to the media host device. As an example, the authentication information can pertain to a device identifier for the portable media device. The device identifier can be unique (e.g., GUID) or pseudo-unique. The device identifier can also be encrypted to provide secure delivery over the network(s). Following the block 314, a decision 316 determines whether authentication has been successful. Here, the media host device, upon receiving the authentication information, attempts to authenticate the portable media device. In one implementation, the media host device stores an access control list that identifies those devices entitled to access the media host device over a network. For example, the access control list can include device identifiers corresponding to those devices (e.g., portable media devices) that are authorized. When the decision 316 determines that authentication has been unsuccessful, as well as when the decision 312 determines that a connection has not been established, an access unavailable message can be displayed 318 on the portable media device. Following the block 318, the manual update process 300 returns to repeat the decision 302 and subsequent blocks.

On the other hand, when the decision 316 determines that the portable media device has been successfully authenticated, the manual content update process 300 continues. Namely, a content update request is sent 320 from the portable media device to the media host device. A decision 322 then determines whether content has been received from the media host device in response to the content update request. When the decision 322 determines that content has been received, the content received is stored 324 to the portable media device (PMD).

In one embodiment, the portable media device can also receive content update instructions from the media host device. The content update instructions are instructions that can be understood and carried out by the portable media device. For example, the content update instructions can cause the portable media device to delete certain existing content from the portable media device, so as to free-up storage space for the newly received content. The content update instructions could also inform the portable media device on how or where to store the newly received content.

After the content received has been stored 324, a decision 326 determines whether the update is completed. When the decision 326 determines that the update is not completed, the manual content update process 300 returns to repeat the decision 322 so that additional content can be received and stored. When the decision 326 determines that the update is completed, then the manual content update process 300 returns to repeat the decision 302 so that subsequent content updates can be similarly processed.

Additionally, when the decision 322 determines that content has not been received, a decision 328 can determine whether the connection to the media host device has been lost. When the decision 328 determines that the connection to the media host device has not been lost, the manual content update process 300 returns to repeat the block 322. Alternatively, when the decision 328 determines that the connection has been lost, the content update is cancelled 330 and then the manual content update process 300 returns to the decision 302 so that subsequent content updates can be similarly processed.

Figure 4:
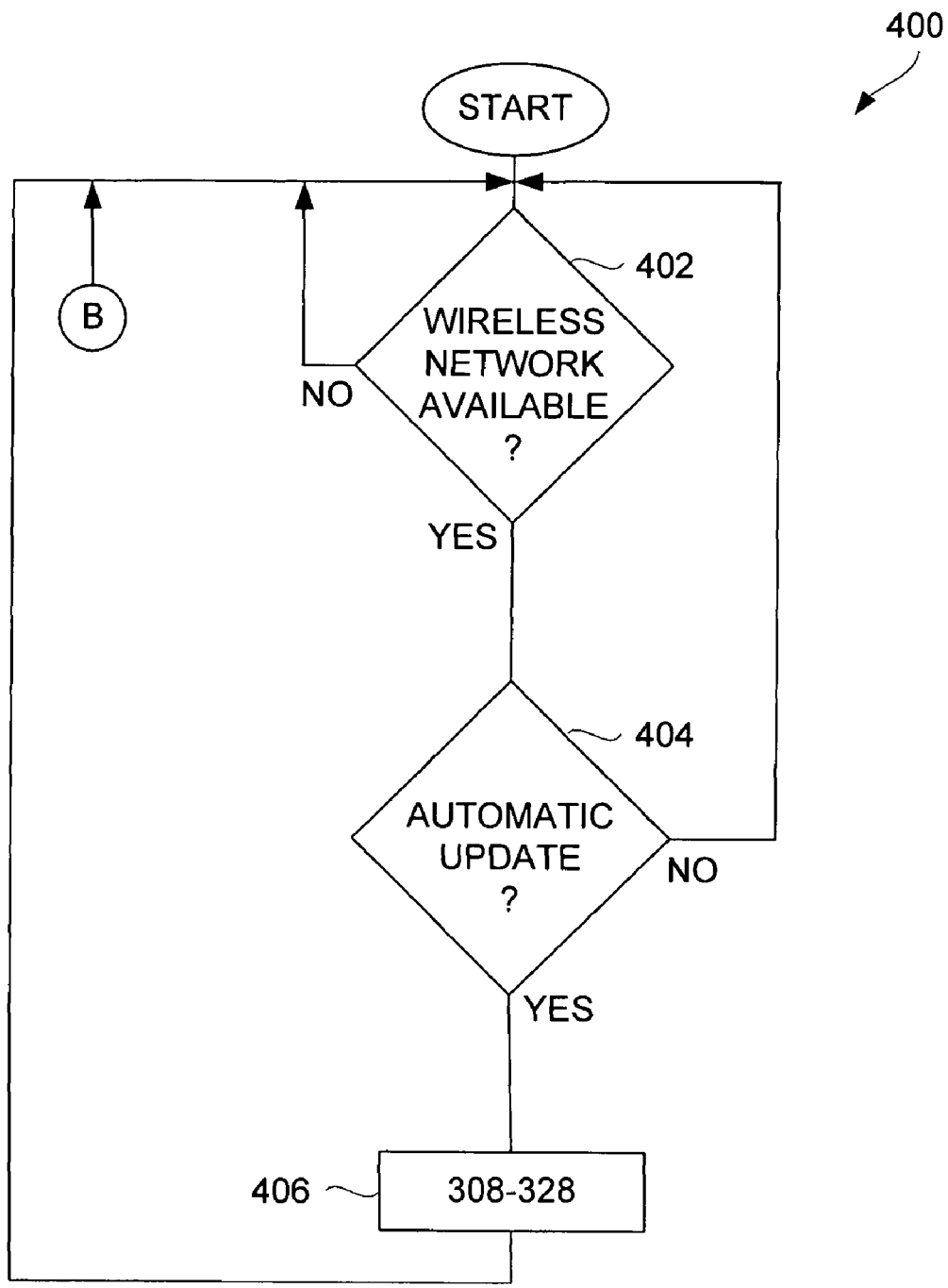
FIG. 4 is a flow diagram of an automatic content update process according to one embodiment of the invention.

FIG. 4 is a flow diagram of an automatic content update process 400 according to one embodiment of the invention. The automatic content update process 400 is, for example, performed by a portable media device, such as the portable media device 110 illustrated in FIG. 1. The automatic content update process 400 begins with a decision 402 that determines whether a wireless network is available to the portable media device. When the decision 402 determines that a wireless network is not available, the automatic content update process 400 waits for network availability. Optionally, a network unavailable indication can be displayed on the portable media device to inform the user of the portable media device of network unavailability.

Alternatively, when the decision 402 determines that a wireless network is available, a decision 404 determines whether an automatic update should be performed at this time. The automatic update can be influenced by one or more criteria, including whether automatic update is enabled by a user preference, by time since last update, and/or by various other update policies. Update policies are discussed below and can vary widely with implementation. As examples, update policies can be dependent on one or more of: (i) available bandwidth through the network, (ii) available storage capacity of the portable media device, (iii) network connection bandwidth, (iv) battery level, (v) quantity of data (e.g., content size), etc. In any case, once the decision 404 determines that an automatic update is not to be performed at this time, the automatic content update process 400 returns to repeat the decision 402; however, a delay can be imposed prior to again performing the decision 402. On the other hand, when the decision 404 determines that an automatic update should be performed at this time, the operations 308-328 discussed above with respect to FIGS. 3A and 3B can be performed at block 406. Thereafter, the automatic content update process 400 returns to repeat the decision 402 so that subsequent automatic content updates can be similarly processed, though a delay can be imposed prior to again performing the decision 402.

Figure 5A:
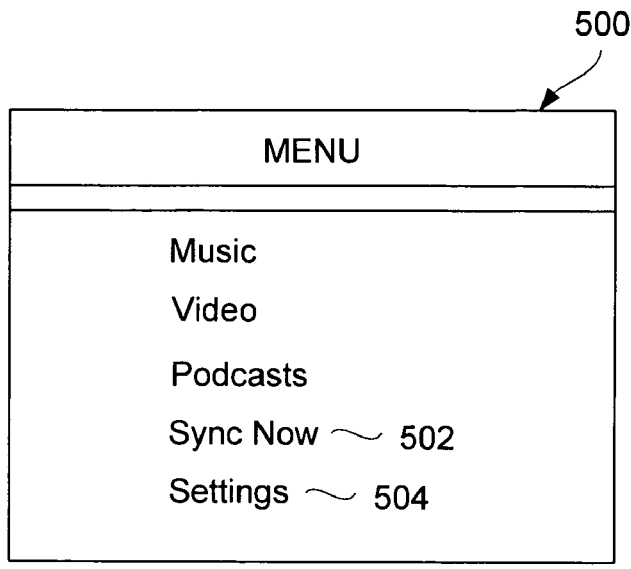
FIG. 5A is a representative menu screen according to one embodiment of the invention.
Figure 5B:
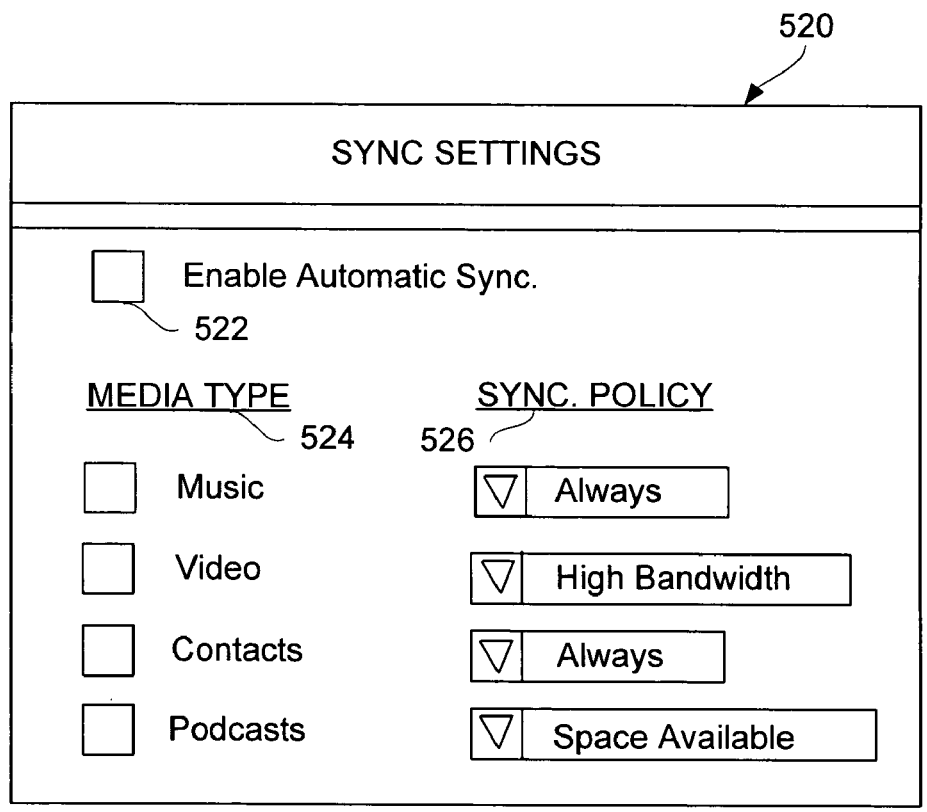
FIG. 5B is a representative synchronization (sync) setting screen according to one embodiment of the invention.
Figure 5C:
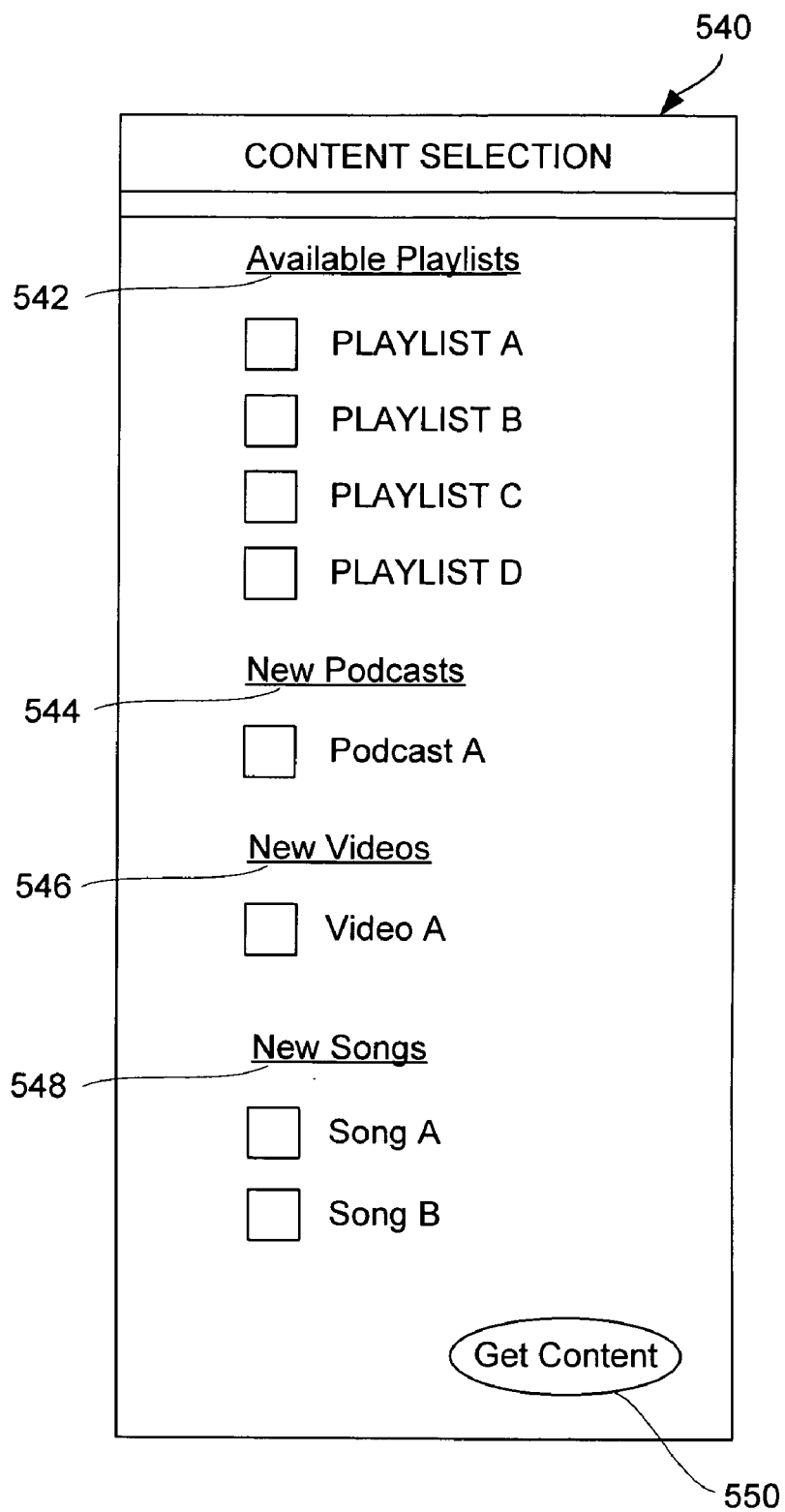
FIG. 5C is a representative content selection screen according to one embodiment of the invention.

One form of content update between different electronic devices is known as synchronization. In the course of updating (e.g., synchronizing) content at a portable media device with content from an associated media host over a network, one or more screens can be presented on a display of the portable media device. These screens can be provided for various purposes, for example: (1) to initiate synchronization, (2) to configure synchronization parameters; and/or (3) to select content for synchronization. FIGS. 5A-5C illustrate several representative screens that could be presented on a display of a mobile media device.

FIG. 5A is a representative menu screen 500 according to one embodiment of the invention. The menu screen 500 can be presented on a display of a portable media device. As shown in FIG. 5A, the menu screen 500 includes a list of selectable items. One of the selectable items is "Sync Now" item 502 and another of the selectable items is "Settings" 504. The user of the portable media device can interact with a user interface so as to select the "Sync Now" item 502. By selecting the "Sync Now" item 502, the user is requesting that the portable media device now be synchronized with an associated media host device. In other words, the selection of the "Sync Now" item 502 from the menu screen 500 operates as a manual request for synchronization of the portable media device with the associated media host device. As an example, in response to the selection of the "Sync Now" item 502, the manual content update process 300 illustrated in FIGS. 3A and 3B can be performed.

FIG. 5B is a representative synchronization (sync) settings screen 520 according to one embodiment of the invention. The sync settings screen 520 can be presented on a display of a portable media device. For example, upon selection of the "Settings" item 504 from the menu screen 500 illustrated in FIG. 5A, a settings screen (not shown) can be presented on the display of the portable media device. Presumably, one option from the settings screen would be for setting synchronization options. Selection of the option pertaining to synchronization options causes the sync settings screen 520 to be displayed. The sync settings screen 520 includes representative settings that a user of the portable media device can make to influence how synchronization is to be performed. In particular, the sync settings screen 520 includes an enable/disable selector 522. The enable/disable selector 522 allows the user to enable or disable automatic synchronization. In the event that automatic synchronization is enabled, the synchronization settings window 520 allows the user to further specify one or more media types 524 to be synchronized as well as one or more synchronization policies 526 to be applied. As shown in FIG. 5B, the media types 524 that can be selected or deselected include Music, Video, Contacts and Podcasts. The synchronization policies 526, as shown in FIG. 5B, can be individually determined for an associated media type. In other words, each media type 524 can utilize a separate synchronization policy 526. On the other hand, the synchronization policies 526 can be used to apply to all media types that are enabled and thus apply cumulatively to all such media types. In FIG. 5B, the exemplary synchronization policies 526 that are shown as being selected for the corresponding media types 524 are Always, High Bandwidth, Always, and Space Available, respectively, for the media types Music, Video, Contacts, and Podcasts. The synchronization policy denoted "Always" indicates a policy to always synchronize this media type. The synchronization policy denoted "High Bandwidth" indicates a policy to synchronize this media type only if high bandwidth network connectivity is available. The synchronization policy denoted "Space Available" indicates a policy to synchronize this media type if the recipient device has adequate available space. Although the sync settings window 520 is described as associated with automatic synchronization, it should be understood that the media types and synchronization policies could also be used to influence the nature of manual synchronization.

FIG. 5C is a representative content selection screen 540 according to one embodiment of the invention. The content selection screen 540 presents to a user selectable list of available content that can be retrieved and supplied to the portable media device. In other words, the user can select some or all of the available content being presented in the content selection screen 540. More particularly, the content identified in the content selection screen 540 can be categorized under various categories of media, including Available Playlists 542, New Podcasts 544, New Videos 546 and New Songs 548. In this representative content selection screen 540, the Available Playlists 542 include one or more different playlists that can be individually selected for delivery to the portable media device. The New Podcasts 544 include one or more new podcasts that can be individually selected for delivery to the portable media device. The New Videos 546 include one or more new videos that can be individually selected for delivery to the portable media device. The New Songs 548 include one or more new songs (or albums) that can be individually selected for delivery to the portable media device. In addition, the content selection screen 540 can include additional user interface controls (not shown) that allow a user to select all content, to select all content of a particular grouping or media type, to select content based on preferences or policies, etc.

Once the desired content has been selected, the user can select a "Get Content" control 550. Upon selection of the "Get Content" control 550, the selected content is requested from the associated media host device.

In one embodiment of the invention, the portable media device does not need to include a media management application. In such case, the portable media device, to the extent it needs assistance of a media management application, makes use of the media management application residing on the associated media host device. In another embodiment, the portable media device includes a media management application. By operating the media management application on the portable media device, the ability of the user of the portable media device to manage their media items is substantially improved.

In one implementation, the content update processing (e.g., synchronization processing) at a media host device (e.g., personal computer) can utilize an application (e.g., media management application) resident on the host computer to perform the comparison and updating of the media items and their attributes between the media host device and the portable media device. One such application is iTunes® media management software, produced by Apple Computer, Inc. of Cupertino, Calif.

Figure 6:
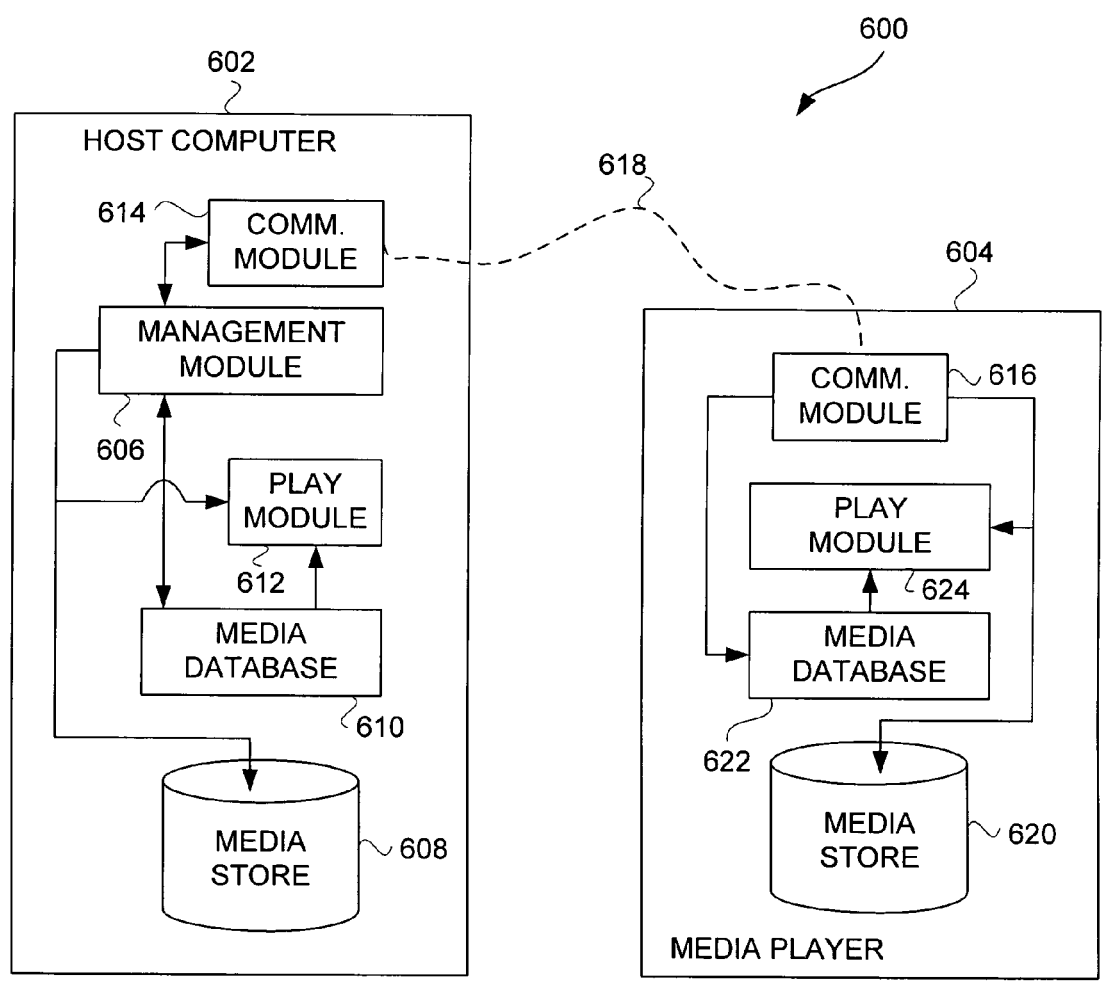
FIG. 6 is a block diagram of a media management system according to one embodiment of the invention.

FIG. 6 is a block diagram of a media management system 600 according to one embodiment of the invention. The media management system 600 includes a host computer 602 (or media host device) and a media player 604 (or portable media device). The host computer 602 is typically a personal computer. The host computer, among other conventional components, includes a management module 606 which is a software module. The management module 606 provides for centralized management of media items (and/or playlists) not only on the host computer 602 but also optionally on the media player 604. More particularly, the management module 606 manages those media items stored in a media store 608 associated with the host computer 602. The management module 606 also interacts with a media database 610 to store media information associated with the media items stored in the media store 608.

The media information pertains to characteristics or attributes of the media items. For example, in the case of audio or audiovisual media, the media information can include one or more of: title, album, track, artist, composer and genre. These types of media information are specific to particular media items. The media information can also indicate one or more of: time purchased, time downloaded, how often played, rating, etc. In addition, the media information can pertain to quality characteristics of the media items. Examples of quality characteristics of media items can include one or more of: bit rate, sample rate, equalizer setting, volume adjustment, start/stop and total time.

Still further, the host computer 602 includes a play module 612. The play module 612 is a software module that can be utilized to play certain media items stored in the media store 608. The play module 612 can also display (on a display screen) or otherwise utilize media information from the media database 610. Typically, the media information of interest corresponds to the media items to be played by the play module 612.

The host computer 602 also includes a communication module 614 that couples to a corresponding communication module 616 within the media player 604. A network connection 618 through one or more networks couples the communication modules 614 and 616. Hence, even when the media player 604 is remotely located from the host computer 602, communication between the devices is possible over the network connection 618.

The media player 604 also includes a media store 620 that stores media items within the media player 604. The media items being stored to the media store 620 can be received over the network connection 618 from the host computer 602. More particularly, the management module 606 sends all or certain of those media items residing on the media store 608 over the network connection 618 to the media store 620 within the media player 604. Additionally, the corresponding media information for the media items that is also delivered to the media player 604 from the host computer 602 can be stored in a media database 622. In this regard, certain media information from the media database 610 within the host computer 602 can be sent to the media database 622 within the media player 604 over the connection or link 618. Still further, playlists identifying certain of the media items can also be sent by the management module 606 over the network connection 618 to the media store 620 or the media database 622 within the media player 604.

Furthermore, the media player 604 includes a play module 624 that couples to the media store 620 and the media database 622. The play module 624 is a software module that can be utilized to play certain media items stored in the media store 620. The play module 624 can also display (on a display screen) or otherwise utilize media information from the media database 622. Typically, the media information of interest corresponds to the media items to be played by the play module 624.

As previously noted, synchronization is a form of media management. The synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 7:
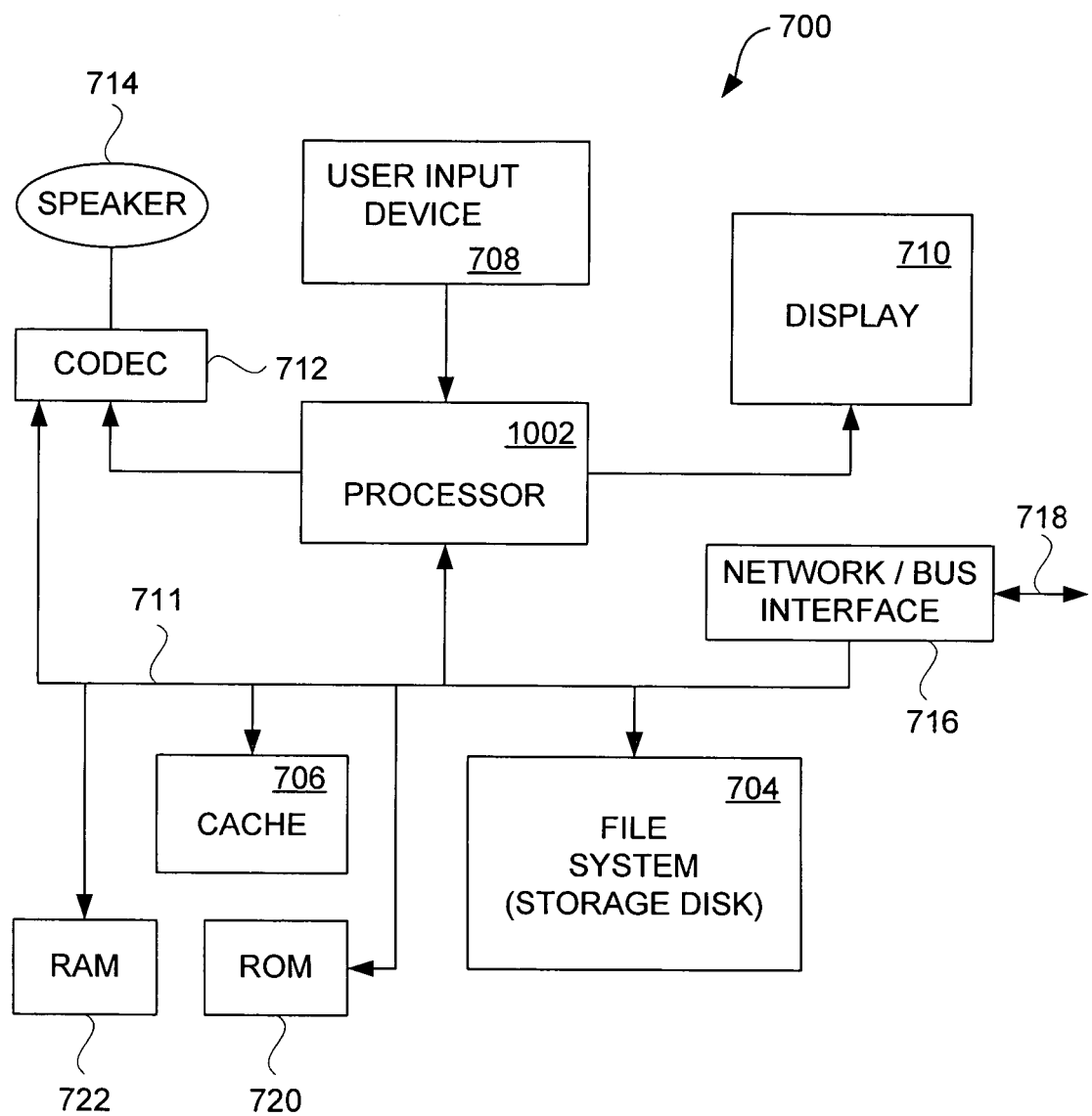
FIG. 7 is a block diagram of a media player according to one embodiment of the invention.

FIG. 7 is a block diagram of a media player 700 according to one embodiment of the invention. The media player 700 includes a processor 702 that pertains to a microprocessor or controller for controlling the overall operation of the media player 700. The media player 700 stores media data pertaining to media items in a file system 704 and a cache 706. The file system 704 is, typically, a storage disk or a plurality of disks. The file system 704 typically provides high capacity storage capability for the media player 700. However, since the access time to the file system 704 is relatively slow, the media player 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is often a concern when the media player 700 is a portable media player that is powered by a battery (not shown). The media player 700 also includes a RAM 720 and a Read-Only Memory (ROM) 722. The ROM 722 can store programs, utilities or processes to be executed in a non-volatile manner. The RAM 720 provides volatile data storage, such as for the cache 706.

The media player 700 also includes a user input device 708 that allows a user of the media player 700 to interact with the media player 700. For example, the user input device 708 can take a variety of forms, such as a button, keypad, dial, etc. Still further, the media player 700 includes a display 710 (screen display) that can be controlled by the processor 702 to display information to the user. A data bus 711 can facilitate data transfer between at least the file system 704, the cache 706, the processor 702, and the CODEC 712.

In one embodiment, the media player 700 serves to store a plurality of media items (e.g., songs) in the file system 704. When a user desires to have the media player play a particular media item, a list of available media items is displayed on the display 710. Then, using the user input device 708, a user can select one of the available media items. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the media player 700 or external to the media player 700. For example, headphones or earphones that connect to the media player 700 would be considered an external speaker.

The media player 700 also includes a network/bus interface 716 that couples to a data link 718. The data link 718 allows the media player 700 to couple to a network. The data link 718 can be provided over a wired connection or a wireless connection. In the case of a wireless connection, the network/bus interface 716 can include a wireless transceiver.

In another embodiment, a media player can be used with a docking station. The docking station can provide wireless communication capability (e.g., wireless transceiver) for the media player, such that the media player can communicate with a host device using the wireless communication capability when docked at the docking station. The docking station may or may not be itself portable.

In yet another embodiment, a larger portable device, such as a vehicle, bag or case, can house or contain the portable media device and also optionally provide the network access.

The media items of emphasis in several of the above embodiments can be audio items (e.g., audio files or songs, audiobooks, and/or podcasts), videos (e.g., movies) or images (e.g., photos). The media items can also be multimedia items. The media items can also be playlists of media items.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a user is able to manage digital data (e.g., media data) residing on a media player from anywhere a network connection is available. Typically, the media player would access a global data network (e.g., the Internet) via a wireless network and then access a host device (e.g., host computer) also connected to the global computer network to obtain updated digital data therefrom. Another advantage of the invention is that the media player, or its user, can initiate update of digital data for the media player. The user of the media player thus does not have to return to the host device to initiate an update; instead, the media player, or its user, can remotely initiate an update. Still another advantage of the invention is that the media player, or its user, can set policies that are used in determining how or when digital data is to be updated.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for updating content on a portable media device received from a media host device, said method comprising:
   receiving at the portable media device a wireless update policy for each of one or more different content types, wherein the one or more different content types includes at least a music type, a playlist type, and a video type, and wherein the wireless update policy defines at least a condition for allowing a wireless transfer to occur between the portable media device and the media host device;
   receiving a user request to update at least some of the content resident on the portable media device from content available on the media host device;
   determining a data transfer characteristic of a wireless connection when the portable media device is in communication with the media host device via the wireless connection;
   sending a content update request to the media host device including selections of one or more specific content types to be updated;
   receiving only the content types having a corresponding wireless update policy in accordance with the determined data transfer characteristic; and
   storing the content received from the media host device onto the portable media device.

2. A method as recited in claim 1, wherein said method further comprises:
   receiving content update instructions from the media host device; and
   updating the content resident on the portable media device in accordance with the content update instructions, said updating including at least said storing of the content received from the media host device onto the portable media device.

3. A method as recited in claim 2, wherein said updating further includes deleting at least a portion of the existing content in accordance with the content update instructions.

4. A method as recited in claim 1, wherein said method further comprises:
   sending authentication information to the media host device; and
   receiving an indication of whether the portable media device is authorized to interact with the media host device.

5. A method as recited in claim 4, wherein the authentication information includes a device identifier associated with the portable media device.

6. A method as recited in claim 5, wherein the device identifier is unique.

7. A method as recited in claim 5, wherein the device identifier is encrypted.

8. A method as recited in claim 1, wherein said determining whether the portable media device presently has network access to the media host device includes at least:
   obtaining network access information pertaining to the media host device; and
   attempting, based on the network access information, to establish a connection through the network between the portable media device and the media host device.

9. A method as recited in claim 1, wherein said receiving of the user request to update the content resident on the portable media device comprises:
   presenting a graphical user interface including a manual update user control; and
   receiving a user selection of the manual update user control.

10. A method as recited in claim 1, wherein said receiving of the content from the media host device comprises:
    presenting a graphical user interface including a plurality of user controls pertaining to available content;
    receiving at least one of the user controls to specify content; and
    subsequently receiving the specified content from the media host device.

11. A method as recited in claim 1, wherein said determining whether the content resident on the portable media device is to be updated is based on update preferences.

12. A method as recited in claim 11, wherein the update preferences are user-specified.

13. A method as recited in claim 11, wherein the update preferences are associated with media types or device or network capabilities.

14. A method as recited in claim 1, wherein the portable media device is a handheld computing device.

15. A method as recited in claim 1, wherein the portable media device is a portable media player, and wherein the media host device is a personal computer.

16. A method for updating content on a portable media device received from a media host device, said method comprising:
    receiving at the portable media device a wireless update policy for each of one or more different content types, wherein the one or more different content types includes at least a music type, a playlist type, and a video type, and wherein the wireless update policy defines at least a condition for allowing a wireless transfer to occur between the portable media device and the media host device;

determining a data transfer characteristic of a wireless connection when the portable media device is in communication with the media host device via the wireless connection;

determining whether the content resident on the portable media device is to be updated from content available on the media host device based on the received wireless update policy for each of the one more different content types;

sending a content update request to the media host device including selections of one or more specific content types to be updated;

receiving only the content types having a corresponding wireless update policy in accordance with the determined data transfer characteristic and storing the content received from the media host device onto the portable media device.

17. A method as recited in claim 16, wherein said method further comprises:

receiving content update instructions from the media host device; and updating the content resident on the portable media device in accordance with the content update instructions, said updating including at least said storing of the content received from the media host device onto the portable media device.

18. A method as recited in claim 17, wherein said updating further includes deleting at least a portion of the existing content in accordance with the content update instructions.

19. A method as recited in claim 16, wherein said method further comprises:

sending authentication information to the media host device; and receiving an indication of whether the portable media device is authorized to interact with the media host device.

20. A method as recited in claim 19, wherein the authentication information includes a device identifier associated with the portable media device.

21. A method as recited in claim 20, wherein the device identifier is encrypted.

22. A method as recited in claim 19, further comprising:

obtaining network access information pertaining to the media host device; and attempting, based on the network access information, to establish a connection through the network between the portable media device and the media host device.

23. A method as recited in claim 16, wherein said receiving of the content from the media host device comprises:

presenting a graphical user interface including a plurality of user controls pertaining to available content;

receiving at least one of the user controls to specify content; and subsequently receiving the specified content from the media host device.

24. A method as recited in claim 16, wherein said determining whether the content resident on the portable media device is to be updated is based on update preferences.

25. A method as recited in claim 24, wherein the update preferences are user-specified.

26. A method as recited in claim 24, wherein the update preferences are associated with media types or device or network capabilities.

27. A computer readable storage medium including computer program code for updating content on a portable device received from a host device, said computer readable storage medium comprising:

computer program code for receiving at the portable media device a wireless update policy for each of one or more different content types, wherein the one or more different content types includes at least a music type, a playlist type, and a video type, and wherein the wireless update policy defines at least a condition for allowing a wireless transfer to occur between the portable media device and the media host device;

computer program code for determining a data transfer characteristic of a wireless connection when the portable media device is in communication with the media host device via the wireless connection;

computer program code for sending a content update request to the host device including selections of one or more specific content types to be updated;

computer program code for receiving only the content types having a corresponding wireless update policy in accordance with the determined data transfer characteristic and computer program code for storing the content received from the host device onto the portable device.

28. A portable media device capable of updating its content via communications with a media host device over a network, said portable media device comprising:

a data storage device that stores the content; and a processor for storing, accessing and presenting the stored content from said data storage device, said processor being configured to: (i) receive at the portable media device a wireless update policy for each of one or more different content types, wherein the one or more different content types includes at least a music type, a playlist type, and a video type, and wherein the wireless update policy defines at least a condition for allowing a wireless transfer to occur between the portable media device and the media host device; (ii) receive a user request to update at least some of the content resident on the portable media device from content available on the media host device; (iii) determine a data transfer characteristic of a wireless connection when the portable media device is in communication with the media host device via the wireless connection; iv) send a content update request to the media host device (v) receive only the content types having a corresponding wireless update policy in accordance with the determined data transfer characteristic and (vi) store the content received from the media host device into said data storage device.

29. The apparatus of claim 28, wherein the processor is further configured to compare an available wireless network connection bandwidth to a selected wireless network connection bandwidth value.

30. The apparatus of claim 28, wherein the processor is further configured to determine a battery level of the portable media device and determine whether to allow the wireless transfer to occur based upon the determined battery level.

31. The apparatus of claim 28, wherein the processor is further configured to determine an available storage capacity of the portable media device and determine whether to allow the wireless transfer to occur based upon the determined available storage capacity.

32. The apparatus of claim 28, wherein the processor is further configured to determine a quantity of data to be transferred and determine whether to allow the wireless transfer to occur based upon the determined quantity of data to be transferred.

* * * * *